(12) United States Patent
Baylis et al.

(10) Patent No.: US 7,407,338 B2
(45) Date of Patent: Aug. 5, 2008

(54) TAPER-LOCK LASER WELD FOR AN AIR INDUCTION COMPONENT

(75) Inventors: Bobbye Kaye Whitenton Baylis, Harrow (CA); Daniel Frank Watt, LaSalle (CA); Xiao Qun Xu, Windsor (CA); James Vanderveen, Blenheim (CA)

(73) Assignee: Mahle International GmbH, Stuttgart (DE)

( * ) Notice: Subject to any disclaimer, the term of this patent is extended or adjusted under 35 U.S.C. 154(b) by 567 days.

(21) Appl. No.: 10/674,623

(22) Filed: Sep. 30, 2003

(65) Prior Publication Data

US 2004/0068227 A1   Apr. 8, 2004

Related U.S. Application Data

(60) Provisional application No. 60/415,630, filed on Oct. 2, 2002.

(51) Int. Cl.
*B29C 65/16* (2006.01)
*F02M 35/104* (2006.01)

(52) U.S. Cl. ............... 403/270; 403/409.1; 123/184.21; 123/184.61; 264/405; 264/409

(58) Field of Classification Search ................. 403/270, 403/339, 340, 409.1; 123/184.21, 184.61; 264/1.37, 405, 328.2, 409
See application file for complete search history.

(56) References Cited

U.S. PATENT DOCUMENTS

| | | | | |
|---|---|---|---|---|
| 3,518,400 A | * | 6/1970 | Gallivan | ................ 219/121.14 |
| 4,600,211 A | * | 7/1986 | Schmidt | ...................... 403/339 |
| 4,819,309 A | * | 4/1989 | Behymer | .................. 24/586.11 |
| 5,031,875 A | * | 7/1991 | Zimmerman | ................. 92/98 R |
| 5,851,194 A | * | 12/1998 | Fratrick | ........................ 24/625 |
| 5,893,959 A | * | 4/1999 | Muellich | .................. 156/272.8 |
| 6,267,093 B1 | * | 7/2001 | Lohr | ..................... 123/184.61 |
| 6,425,198 B2 | * | 7/2002 | Voss et al. | .................... 38/77.8 |
| 6,478,451 B2 | * | 11/2002 | Akiyama et al. | ............. 362/267 |
| 6,520,708 B1 | * | 2/2003 | Jung et al. | ............... 403/409.1 |
| 6,528,755 B2 | * | 3/2003 | Grewell et al. | ......... 219/121.63 |
| 6,592,239 B1 | * | 7/2003 | Akiyama et al. | ............. 362/267 |
| 6,758,182 B2 | * | 7/2004 | Nomizo et al. | ......... 123/184.57 |
| 6,772,568 B2 | * | 8/2004 | Thiers et al. | ................. 403/381 |
| 6,841,024 B2 | * | 1/2005 | Drummond et al. | .... 219/121.63 |
| 6,877,627 B2 | * | 4/2005 | Brandner et al. | ........... 220/4.13 |

FOREIGN PATENT DOCUMENTS

JP   2001105500 A   *   4/2001
JP   2002283457 A   *   10/2002

OTHER PUBLICATIONS

Robert Grimm, "Infrared Welding of Polymers", May 2001, Medical Device and Diagnostic Industry, p. 158.*

* cited by examiner

*Primary Examiner*—Daniel P. Stodola
*Assistant Examiner*—Ernesto Garcia
(74) *Attorney, Agent, or Firm*—Carlson, Gaskey & Olds

(57) ABSTRACT

A transparent component portion includes a first weld surface and a first taper locking surface formed opposite from the first weld surface. An absorbing component portion includes a second weld surface and a second taper locking surface formed opposite from the second weld surface. The first and second taper locking surfaces cooperate to force and lock the first and second weld surfaces into abutting engagement for laser welding.

12 Claims, 3 Drawing Sheets

TAPER-LOCK LASER WELD FOR AN AIR INDUCTION COMPONENT

CROSS-REFERENCE TO RELATED APPLICATIONS

The application claims priority to U.S. Provisional Application No. 60/415,630, which was filed on Oct. 2, 2002.

BACKGROUND OF THE INVENTION

This invention relates to a method and system that uses a taper-lock laser weld joint for air induction components.

Air induction systems typically include several different induction components, such as air cleaners, air hoses, resonators, intake manifolds, etc., with each component being attached to at least one other component to provide an air induction assembly forming a pathway for air moving through the air induction system. Various different attachment methods can be used to attach plastic air induction components to each other or to weld portions of such components together. One preferred method utilizes vibration welding to permanently weld portions of components together.

In a traditional vibration welding process, each section of the air induction component includes a flange against which a clamping force is exerted to clamp the sections of the component together prior to welding. Once the sections of the component are clamped together, one section is vibrated against the other along a predetermined weld bead to melt the plastic and attach the components together.

The traditional vibration welding method has some disadvantages. For example, additional component material is required to form the flanges, beads and flash traps on the components. This material adds extra weight and cost and provides no additional benefit to the components, once the air induction system is assembled on to an engine. Further, exerting and maintaining the clamping force during the vibration welding process also adds cost.

Because vibration welding removes material as flash during the melting process, the weld beads must be designed with the additional material added. Since the amount of material removed from any section of weld bead at an angle to the clamping force depends upon the angle, calculation of the correct amount of material to add can be complicated. Another disadvantage of vibration welding is that the weld bead must be mounted on a flange which displaces the joint laterally from a true tensile load. Such a joint is subjected to a peel component, which considerably weakens the joint.

Another joining process for plastic air induction components is through-transmission laser welding. This process requires the two surfaces that are to be joined together, be clamped together with the clamp components. If these two surfaces are simply overlapping flat surfaces, the two clamp components must be located directly on the surface to be welded, one above and one below. In this configuration, the laser must either pass through one of the clamps or the clamp must move away just before the traveling laser approaches, then the clamp must re-engage after the laser passes. In this latter example the opening, moving away, moving back into place, and then closing of the clamp significantly slows the laser welding process down. In the former case, one part of the clamp must be formed from a transparent material so that the laser beam can pass through the clamp. Using a transparent material for the clamp is not desirable because if the clamp material becomes dirty, the energy of the laser beam is absorbed and can cause the clamp to heat up and melt or shatter. Hence neither one of these solutions is satisfactory.

Thus, it is desirable to have a laser beam welding method and apparatus that can provide a clear laser path to the surface to be welded (faying surface) of the component, as well as overcoming the other above mentioned deficiencies with the prior art. Further, the process should use less material and require no change in the geometry of the component during welding such that the welds resulting are much stronger because the welds are formed to fail in tension rather than having a peel component.

SUMMARY OF THE INVENTION

Air induction components are generally complicated hollow parts through which air passes. To make a plastic hollow part by injection molding requires either using lost-core technology or making multiple portions of the part and welding them together. A method for laser welding a first portion of the component to a second portion of the component includes using weld joints having tapered surfaces on the first and second portions to force first and second weld surfaces into abutting engagement at a predetermined pressure to define a laser joint weld area. A laser beam is then directed through the first and onto the second weld surface to melt the surfaces and permanently attach the first and second portions of the component together.

One portion of the component is made from a laser-transparent material and the other portion of the component is made from a non-transparent material. The laser beam passes through the transparent material and into the non-transparent material, which serves as an absorber. The laser beam melts the absorbing non-transparent material, which in turn melts the transparent material to form the laser weld that attaches the components together.

In one disclosed embodiment, the component is preferably an air induction component such as a manifold for example, which is mounted to a vehicle engine. One portion of the air induction component includes a first laser weld surface and a first taper locking surface opposite from the first laser weld surface. A second portion of the air induction component includes a second laser weld surface and includes a second taper locking surface opposite from the second laser weld surface. The first and second taper locking surfaces cooperate with each other to force the first and second laser weld surfaces into abutting engagement at a predetermined pressure. The first and second taper locking surfaces preferably lock the first and second laser weld surfaces together and cooperate to maintain the predetermined pressure during the laser welding process.

In one disclosed embodiment, the first and second laser weld surfaces define first and second tapered surfaces. The first tapered weld surface defines a first angle and the second tapered weld surface defines an angle that is different than the first angle. When the first component is formed from a transparent material, the first angle is preferably greater than the second angle. Further, the first and second taper locking surfaces define a taper locking angle that is at least twice that of both the first and second angles. This dual tapered interface configuration generates and maintains the desired pressure levels that are required to achieve a satisfactory laser weld joint.

The subject system and method provide a simple and effective laser welding process to permanently attach portions of a component to each other. These and other features of the present invention can be best understood from the following specifications and drawings, the following of which is a brief description.

DETAILED DESCRIPTION OF A PREFERRED EMBODIMENT

Figure 1:
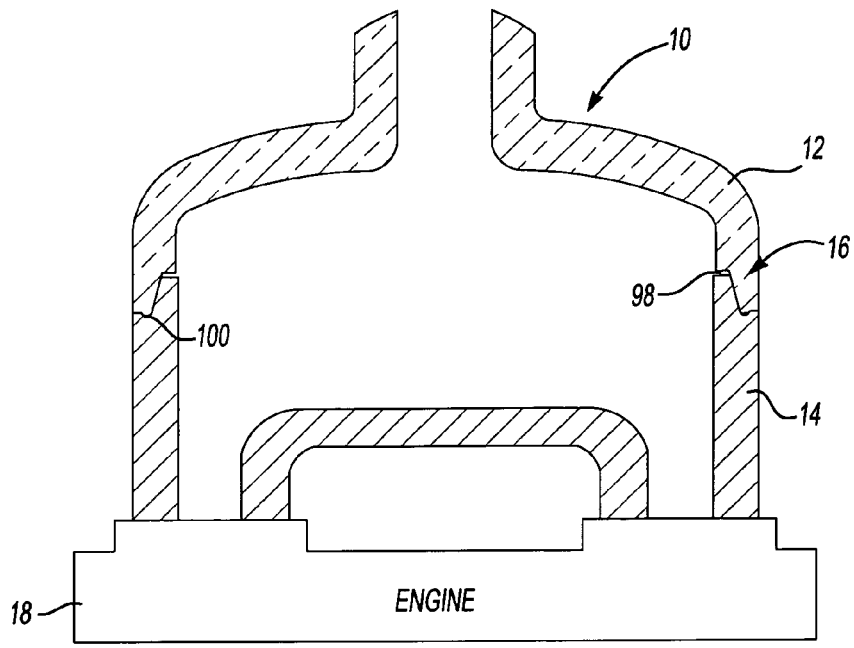
FIG. 1 is a schematic environmental view of a laser weld for induction system components incorporating the subject invention.

A cross section of an idealized air induction component, such as a manifold for example, for an air induction system is shown generally at 10 in FIG. 1. The following description refers to the air induction component as a manifold, however, it should be understood that the invention could be utilized with other similar components. The manifold 10 includes at least a first portion or upper shell 12, and a second portion or lower shell 14. While first 12 and second 14 shells of the manifold 10 are shown, it should be understood that additional portions or shells could be required to form a complete component. Further, the first 12 and second 14 shells could be different portions of the same component (as above) or they could be different components within the air induction system.

The air induction components or shells thereof are permanently attached to one another along a laser weld joint area, shown generally at 16. First, the shells 12, 14 are attached to each other to form the air induction manifold 10. Then the air induction manifold 10 is mounted to a vehicle engine 18 to distribute clean air to the different cylinders of the engine 18.

It should be understood that the air induction manifold or system 10 can include additional air induction components and that these additional components can also be joined or attached to each other, as needed, with laser welding in a manner similar to that detailed below. Further, while only one laser weld joint 16 is shown, multiple laser weld joints areas may be needed to attach the multiple shells together.

In one disclosed embodiment, the first shell 12 includes a first body portion 20 with a first wall extension 22 extending transversely to the first body portion 20. The first extension 22 includes a first portion 24 and a second portion 26 opposite from the first portion 24. The first extension 22 defines a first laser weld surface 28 on the first portion 24 and includes a first taper locking surface 30 formed on the second portion 26.

The first laser weld surface 28 is preferably formed as a tapered surface. The first laser weld surface 28 transitions into a first ledge 32 that extends from one end 34 of the tapered surface of the first laser weld surface 28 to an outer surface 36 of the first portion 24 of the extension 22. The first taper locking surface 30 transitions into a second ledge 38 that extends from one end 40 of first taper locking surface 30 to an outer surface 42 of the second portion 26 of the extension 22. A transition surface 44 connects an opposite end 46 of the tapered surface of the first laser weld surface 28 to the opposite end 48 of the taper locking surface 30. Preferably, the transition surface 44 comprises a curvilinear surface, with a flat section 45 at the lower end. The first laser weld surface 28 and the first taper locking surface 30 face away from each other and are separated by the transition surface 44.

The second shell 14 includes a second body portion 50 with a second wall extension 52 extending transversely to the second body portion 50. The second extension 52 includes a first portion 54 and a second portion 56 opposite from the first portion 54. The second extension 52 defines a second laser weld surface 58 on the first side 54 and includes a second taper locking surface 60 formed on the second portion 56.

The second laser weld surface 58 is preferably formed as a tapered surface. The second laser weld surface 58 transitions into a first ledge 62 that extends from one end 64 of the tapered surface of the second laser weld surface 58 to an outer surface 66 of the first portion 54 of the extension 52. The second taper locking surface 60 transitions into a second ledge 68 that extends from one end 70 of the second taper locking surface 60 to an outer surface 72 of the second portion 56 of the extension 52. A transition surface 74 connects an opposite end 76 of the tapered surface of the second laser weld surface 58 to the opposite end 78 of the taper locking surface 60. Preferably, the transition surface 74 comprises a completely curvilinear surface. The second laser weld surface 58 and the second taper locking surface 60 face each other and are separated by the transition surface 74. The surfaces 74 and 44 do not make full contact when the extension 52 meets the extension 22 (see FIG. 2B).

The first shell 12 includes a first clamping flange 80 that extends transversely to the first extension 22. The second shell 14 includes a second clamping flange 82 that extends transversely to the second extension 52. The first clamping flange 80 receives a first clamp member 84 and the second clamping flange 82 receives a second clamp member 86. The clamp members 84, 86 exert a clamping force CF that moves the first and second extensions 22, 52 toward each other along a first path. This moves the first 30 and second 60 taper locking surfaces into engagement with each other. The first 30 and second 60 taper locking surfaces cooperate with each other to force the first 28 and second 58 laser weld surfaces into abutting engagement with each other. The first 30 and second 60 taper locking surfaces move the first 28 and second 58 laser weld surfaces along a second path that is transverse to the first path. A laser 90 directs a laser beam 92 toward the first 28 and second 58 laser weld surfaces to form the laser weld joint 16.

Preferably, a small gap 98 (see FIG. 1) is maintained between ledges 32, 62. The gap 98 ensures that when the shells 12, 14 are brought together that contact is made first at the taper locking surfaces 30, 60 near the bottom of the interface. Preferably, as shown more clearly in FIG. 2A, the gap 98 is at least 0.1 mm when locking contact is made, i.e. contact is made betweens surfaces 74, 60, 68 of the second shell 14 mating with surfaces 44, 30, 38 of the first shell 12.

This 0.1 mm gap 98 can be achieved by various geometric configurations. In one example, the distance along surface 72 from the ledge 68 to the flange 82 is 2.22 mm, as is the distance along surface 36 from ledge 32 to the wall of main body portion 20. The vertical distance along surface 66 from ledge 62 to the wall of main body portion 50 is 7.68 mm and the vertical distance along surface 42 from ledge 38 to flange 80 is 7.78 mm, which is 0.1 mm longer than the distance along surface 66. Thus, when the shells 12, 14 are brought together, the .1 mm difference results in the gap 98 of 0.1 mm between ledges 62 and 32.

The significance of the gap 98 is that when the shells 12, 14 are brought together, the second extension 52 will not contact with the first extension 22 prior to contact between the taper locking surfaces 30, 60. If initial contact is first made between the extensions 22, 52 then the clamping force CF causes the extension 52 to buckle, which destroys the interference fit between the weld surfaces 28, 58. Thus, maintaining the gap 98, in combination with the interference fit between weld surfaces 28, 58 generated by initial contact between the tapered locking surfaces 30, 60, is important to achieving a successful weld.

There is also a gap 100 between surface 44 of extension 22 and surface 74 of extension 52, caused by the flat section 45 on the lower end of the partially curvilinear surface 44 not mating with the fully curvilinear surface 74. This gap 100 is necessary to assure that the initial contact is between surfaces 30 and 60 and between ledges 38 and 68.

Further, at least one of the first 12 or second 14 shells is constrained from moving along the second path relative to the other of the first 12 or second 14 induction components. This constraint allows the first 30 and second 60 taper locking surfaces to lock the first 28 and second 58 laser weld surfaces in abutting engagement and to maintain this abutting engagement at a predetermined pressure level during the welding process.

Figure 2A:
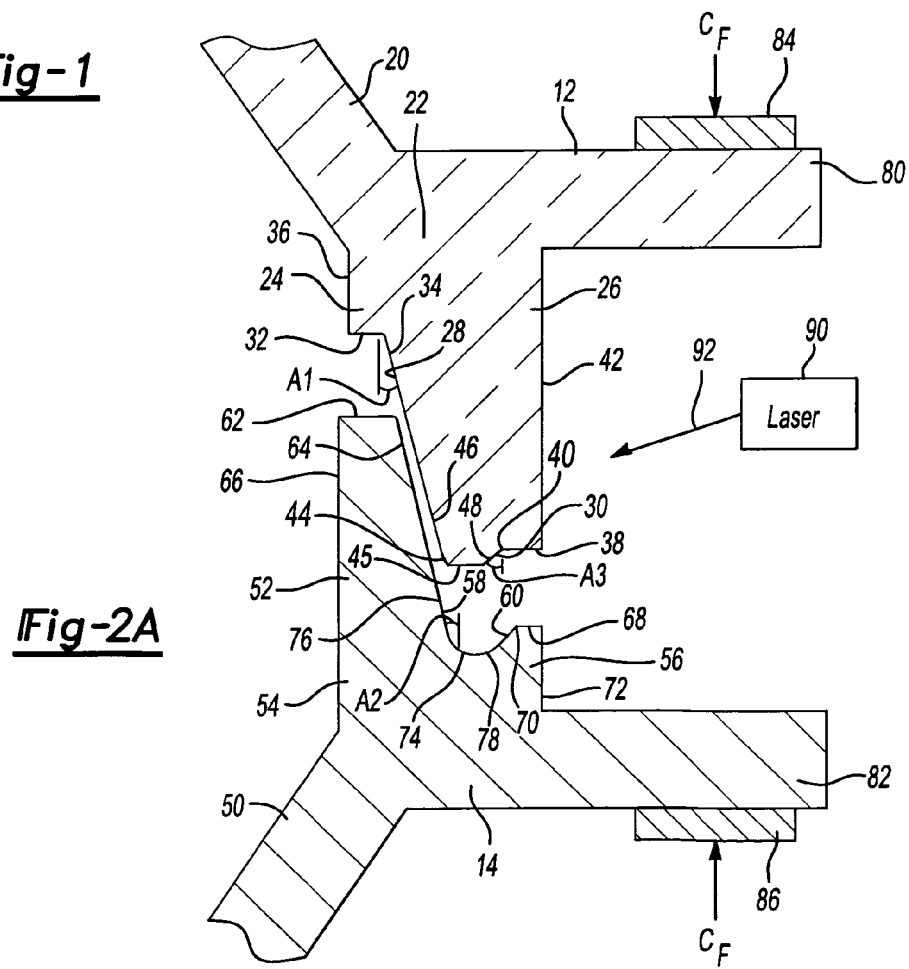
FIG. 2A is a cross-sectional view of one embodiment of a laser weld joint incorporating the subject invention prior to laser welding.

In FIG. 2A, the clamp members 84, 86 move the first 22 and second 52 wall extensions toward each other in a generally vertical direction to define the first path. The taper locking surfaces 30, 60 move the flanges 80, 82 in a generally lateral direction to define the second path. It should be understood that the terms vertical and lateral are merely descriptive terms used to describe the direction of forces as shown in the FIGS.

The predetermined pressure level is maintained at a pressure of at least one hundred and ninety (190) pounds per square inch (psi) during the laser welding process. Preferably the pressure level is maintained at pressure level of approximately at least two hundred ten (210) psi to achieve a good laser weld.

Figure 2B:
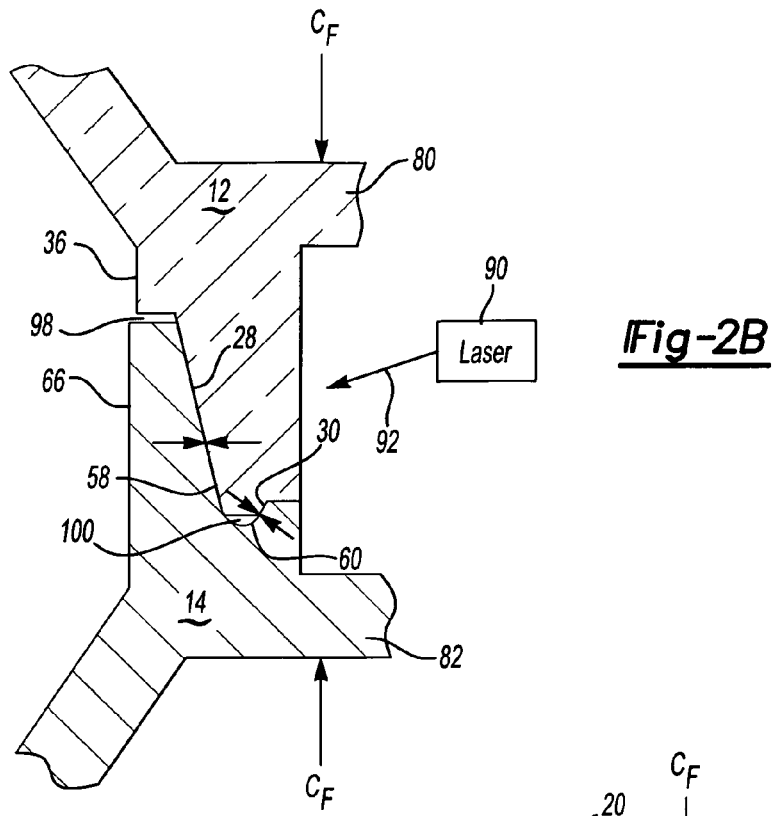
FIG. 2B is the embodiment of FIG. 2A shown during laser welding.

FIG. 2A shows the first 22 and second 52 extensions prior to engagement between the first 30 and second 60 taper locking surfaces. FIG. 2B shows the first 22 and second 52 extensions in abutting engagement during the laser welding process. The laser 90 preferably directs the laser beam 92 in a direction that is perpendicular to at least one of the first 28 or second 58 laser weld surfaces.

The configuration shown in FIGS. 2A and 2B is the preferred embodiment, whereby surfaces 36 and 52 are inner wall surfaces of the component and surfaces 42 and 72 are outer wall surfaces of the component. In this configuration, surface 42 is the first surface to receive the laser beam 92. It is also possible to use a mirror imaged configuration of the joint design whereby surfaces 42 and 72 are inner wall surfaces and surfaces 36 and 52 are outer wall surfaces. It is possible to weld in this mirror imaged configuration, but the resulting component will be weaker since the laser 90 will be unable to reach any of the surfaces past surface 74. In the preferred embodiment, the surface that cannot be reached by the laser 90, i.e. the surface along ledge 32, is much shorter. In both configurations, the unwelded surfaces act as stress risers when these hollow components are subjected to internal pressure as in a burst test. In the preferred embodiment, the thickness of wall upon which the stress riser is acting is larger than in the mirror imaged configuration. Therefore, the component can withstand higher internal pressure before a crack propagates through the wall.

Figure 3:
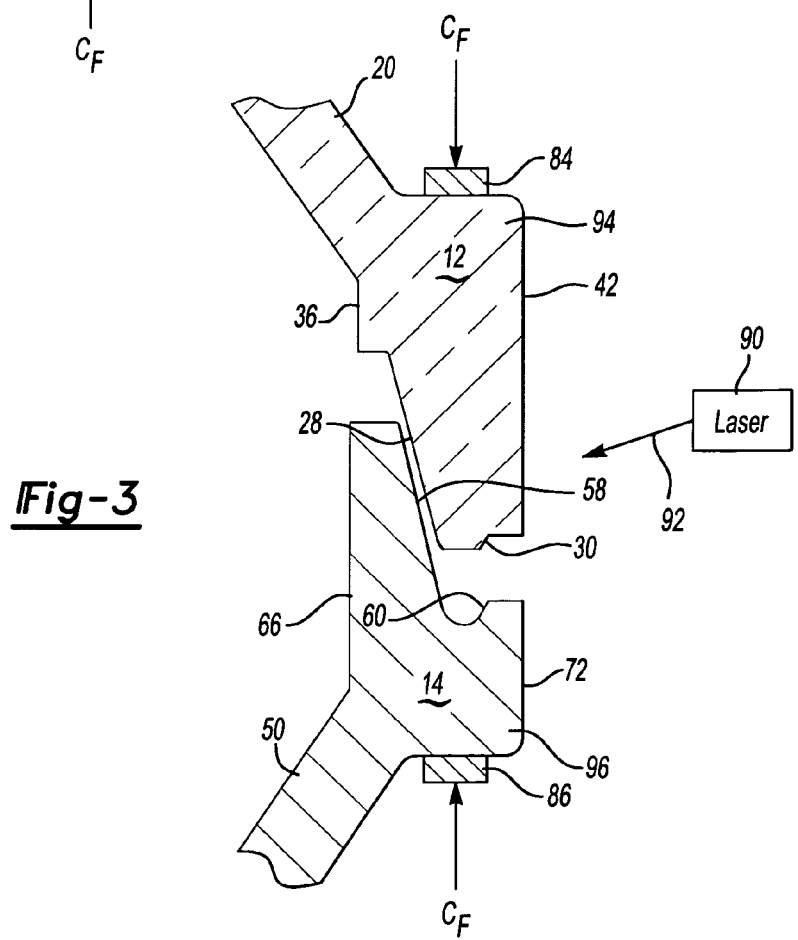
FIG. 3 is a cross-sectional view of an alternate embodiment incorporating the subject invention.

The embodiment shown in FIG. 3 is similar to that shown in FIGS. 2A and 2B. However, while the embodiment of FIGS. 2A and 2B utilizes existing clamping flanges 80, 82, the embodiment of FIG. 3 utilizes first and second mini-flanges 94, 96 that receive the clamps 84, 86. The mini-flanges 94, 96 significantly reduce the amount of material needed to form the wall extensions 22, 52, which in turn reduces the overall weight of the first 12 and second 14 air induction components.

Figure 4:
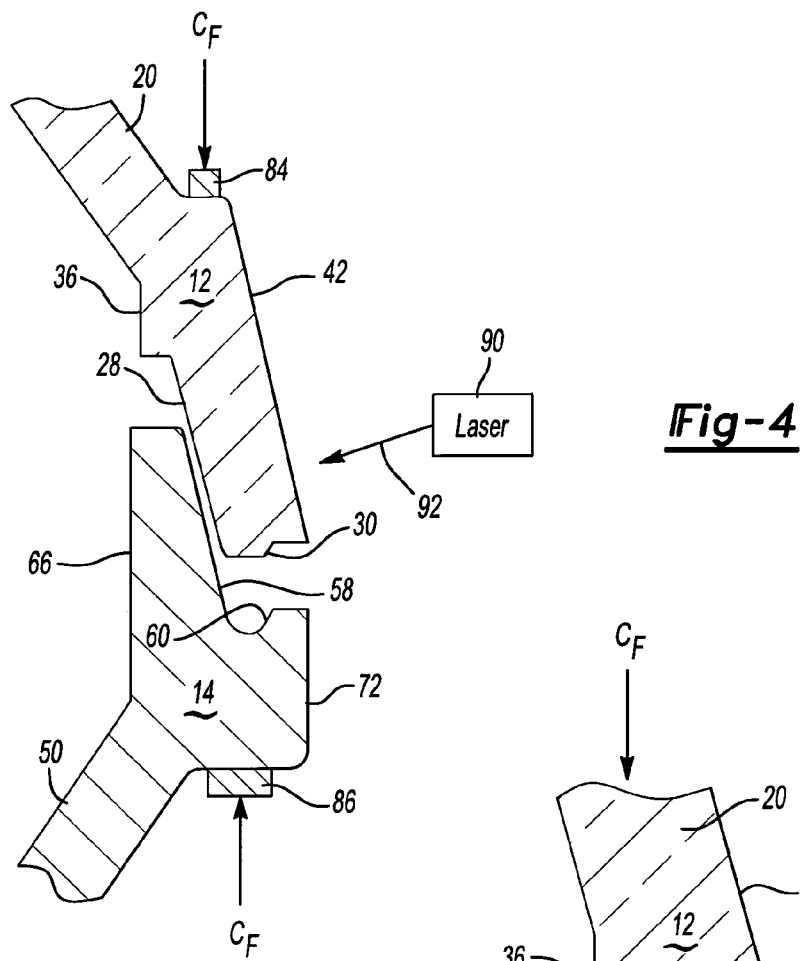
FIG. 4 is a cross-sectional view of an alternate embodiment incorporating the subject invention.

The embodiment shown in FIG. 4 is similar to the embodiment of FIG. 3, but further reduces the amount of material needed to form the wall extension 22. This is accomplished by making the outer surface 42 of the one side of the wall extension 22 generally parallel to the first laser weld surface 28. This embodiment is preferred over the embodiment shown in FIG. 3 because the amount of material that the laser beam 92 is required to pass through is equal throughout the weld area. This ensures a more even heating of surface 58. Further, because the laser beam is now perpendicular to the outer surface, there is less loss of laser energy due to reflection.

Figure 5:
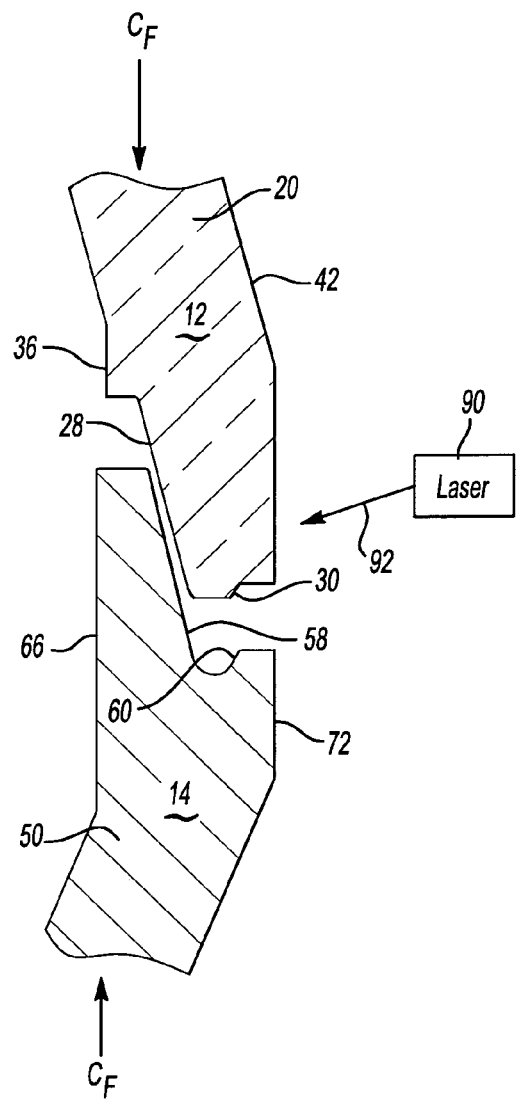
FIG. 5 is a cross-sectional view of an alternate embodiment incorporating the subject invention.

The embodiment of FIG. 5 is similar to that of FIGS. 2A, 2B, 3, and 4 but eliminates the clamping flanges 80, 82 and 94, 96 altogether. The force required to move the first 30 and second 60 taper locking portions into engagement with each other is applied through the body portions 20, 50 of the first 12 and second 14 air induction components.

In each of the disclosed embodiments, the first shell 12 is made from a laser transparent material and the second shell 14 is made from a non-transparent (absorbing) material. Any type of transparent and non-transparent materials known in the art could be used. The laser beam 92 passes through the transparent material and into the non-transparent material, which serves as an absorber. The laser beam 92 heats the absorbing non-transparent material, causing it to melt, which in turn melts the transparent material to form the laser weld joint 16 that attaches the shells 12, 14 together.

Each of the disclosed embodiments also include a similar preferred geometry that achieves the taper-lock, i.e. achieves a configuration that forces and holds the first 28 and second 58 laser weld surfaces at the desired pressure levels for laser welding. The first laser weld surface 28 is a tapered surface that is defined by a first angle A1. The second laser weld surface 58 is a tapered surface that is defined by a second angle A2. Preferably, the first angle A1 is greater than the second angle A2.

Also, the first 30 and second 60 taper locking surfaces are defined by the same taper angle A3. This taper angle A3 is preferably at least twice that of the first A1 and second A2 angles. In the preferred configuration, the first angle is at least fourteen (14) degrees, the second angle is at least twelve (12) degrees, and the taper locking angle is at least thirty-six (36) degrees. While this configuration is preferred, it should be understood that other similar geometric configurations could also be used.

The subject invention provides several benefits over traditional laser welding systems. The taper locking feature allows the clamps 84, 86, which apply the clamping force CF, to be moved out of the direct path of the laser beam 92 in all configurations. Further, the finished laser weld joint 16 lies within the wall stock or wall extensions 22, 52 of the shells 12, 14 and therefore is not exterior to the component walls, as when located on the flanges 80, 82 in traditional configurations. Further, the elimination of the flanges 80, 82 provides a smaller and lighter component. Hence, in this configuration, burst testing (a known test that determines the strength of the weld) results in a tensile failure rather than a peel failure. As known, welds are stronger with respect to tensile failures than with respect to peel failures.

Additional benefits are provided that relate to the meltdown traditionally generated during the laser welding process. There is no meltdown during laser welding with this unique dual tapered interface weld joint configuration. Thus, no allowance for meltdown needs to be built into the components during the design phase. This is beneficial because determining accurate allowance for meltdown is difficult when weld surfaces are angled relative to the clamping force $C_F$. In the subject configuration, once the shells 12, 14 are clamped together, the assembly has the same geometry before and after the welding.

Further, the subject invention satisfies the following requirements that are needed to achieve a satisfactory transmission laser weld joint between plastic components. Preferably, a thickness of the transparent material at the weld is four (4) millimeters (mm) or less. A general wall thickness of three (3) to two and one half (2.5) mm is preferred. Also, the width of the weld surface is preferably at least five and one half (5.5) mm, which corresponds to the maximum track width of the laser beam 92.

The subject invention also provides an angled joint where the angled surface is long enough to allow for offset caused by distortion, and which is strong enough to withstand forces required to eliminate offset. Further, the subject invention includes a locking feature that prevents the shells 12, 14 from sliding relative to one another, and includes a taper feature that, once engaged during clamping, drives the weld surfaces 28, 58 together for welding.

The subject invention also utilizes a minimum amount of material and provides a gapless interface between weld surfaces 28, 58. Further, the tapered weld joint 16 is designed to withstand the forces needed to eliminate the gaps. Approximately five hundred (500) pounds of clamping force $C_F$ is sufficient to overcome any component warp. As discussed above, preferably, pressure of at least 210 psi is maintained between weld surfaces 28, 58 to assure repeatable welds.

Preferably, the weld joint 16 should be as nearly parallel to an upper surface of the first (transparent) shell 12 as possible. This allows the laser beam 92 to be nearly perpendicular to both the upper surface and the surface to be welded and reduces loss of beam energy due to reflection. Further, this allows heating by the laser 90 to be symmetric about the center of the beam 92.

Preferably, no parting lines are allowed to cross the weld surface. Further, the weld surface is preferably not located at a point of change in the interior curvature of a part, i.e., the weld is not located at a position immediately below the flange 80, 82, and is instead positioned near the middle of a straight section, i.e. positioned along the wall extensions 22, 52. This preserves the integrity of the weld.

The subject laser weld joint also satisfies other known requirements that must be achieved to form a satisfactory weld. Although a preferred embodiment of this invention has been disclosed, a worker of ordinary skill in this art would recognize that certain modifications would come within the scope of this invention. For that reason, the following claims should be studied to determine the true scope and content of this invention.

The invention claimed is:

1. An air induction component assembly comprising:
    a first shell made from a laser-transparent material defining a first laser weld surface and including a first taper locking surface opposite from said first laser weld surface;
    a second shell made from a laser absorbing material defining a second laser weld surface and including a second taper locking surface opposite from said second laser weld surface wherein said first laser weld surface comprises a first tapered surface portion defining a first angle and said second laser weld surface comprises a second tapered surface portion defining a second angle different than said first angle; and
    a laser weld joint area formed at said first and second laser weld surfaces to permanently attach said first shell to said second shell wherein said first and second taper locking surfaces cooperate with each other to lock said first and second laser weld surfaces into abutting engagement at a predetermined pressure during a laser welding process, and wherein at least one of said first and second taper locking surfaces defines a taper angle that is at least twice that of both said first and second angles.

2. An air induction component assembly as set forth in claim 1 wherein the predetermined pressure is at least 190 pounds per square inch (psi).

3. An air induction component assembly as set forth in claim 1 wherein a laser beam is applied generally perpendicular to at least one of said first and second tapered surfaces.

4. An air induction component assembly comprising:
    a first shell made from a laser-transparent material defining a first laser weld surface and including a first taper locking surface opposite from said first laser weld surface wherein said first shell includes a first wall extension having an inner wall surface and an outer wall surface, said first wall extension extending from a first base end to a first distal end with said first laser weld surface and said first taper locking surface being formed on said first wall extension;
    a second shell made from a laser absorbing material defining a second laser weld surface and including a second taper locking surface opposite from said second laser weld surface wherein said first laser weld surface comprises a first tapered surface portion defining a first angle and said second laser weld surface comprises a second tapered surface portion defining a second angle different than said first angle, and wherein said second shell includes a second wall extension having an inner wall surface and an outer wall surface, said second wall extension extending from a second base end to a second distal end with said second laser weld surface and said second taper locking surface being formed on said second wall extension, and wherein said first and said second wall extensions overlap each other such that said first and said second taper locking surfaces directly abut each other; and
    a laser weld joint area formed at said first and second laser weld surfaces to permanently attach said first shell to said second shell wherein said first and second taper locking surfaces cooperate with each other to lock said first and second laser weld surfaces into abutting engagement at a predetermined pressure during a laser welding process.

5. An air induction component assembly as set forth in claim 4 wherein said first laser weld surface tapers to a flat surface formed at said first distal end, said flat surface transitioning from said first laser weld surface to said first taper locking surface.

6. An air induction component assembly as set forth in claim 5 including a first ledge surface transitioning from said inner wall surface of said first wall extension to said first laser weld surface, and a second ledge surface transitioning from said outer wall surface of said first wall extension to said fist taper locking surface.

7. An air induction component assembly as set forth in claim 6 wherein said second laser weld surface tapers to a curved surface formed near said second base end, said curved surface transitioning from said second laser weld surface to said second taper locking surface.

8. An air induction component assembly as set forth in claim 7 including a third ledge surface transitioning from said inner wall of said second wall extension to said second laser weld surface, and a fourth ledge surface transitioning from said outer wall surface of said second wall extension to said second taper locking surface.

9. An air induction component assembly as set forth in claim 8 wherein said first and third ledge surfaces are spaced apart from each other to form a first gap when said first and second laser weld surfaces are locked into abutting engagement by said first and second laser locking surfaces.

10. An air induction component assembly as set forth in claim 9 wherein said second and fourth ledge surfaces are in direct contact with each other when said first and second laser weld surfaces are locked into abutting engagement by said first and second laser locking surfaces.

11. An air induction component assembly as set forth in claim 9 wherein said flat surface is spaced apart from said curved surface to form a second gap when said first and second laser weld surfaces are locked into abutting engagement by said first and second laser locking surfaces.

12. An air induction component assembly comprising:
a first shell made from a laser-transparent material defining a first laser weld surface and including a first taper locking surface opposite from said first laser weld surface, and wherein said first shell includes a first transition surface that transitions from said first laser weld surface to said first taper locking surface;
a second shell made from a laser absorbing material defining a second laser weld surface and including a second taper locking surface opposite from said second laser weld surface, and wherein said second shell includes a second transition surface that transitions from said second laser weld surface to said second taper locking surface, and wherein said first laser weld surface comprises a first laser surface portion defining a first angle and said second laser weld surface comprises a second tapered surface portion defining a second angle different than said first angle;
said first transition surface including a flat segment and said second transition surface including a curved segment that directly faces said flat; and
a laser weld joint area formed at said first and second laser weld surfaces to permanently attach said first shell to said second shell wherein said first and second taper locking surfaces cooperate with each other to lock said first and second laser weld surfaces into abutting engagement at a predetermined pressure during a laser welding process.

* * * * *